United States Patent [19]

Weintraub et al.

[11] 4,047,743
[45] Sept. 13, 1977

[54] LIGHT WALLED CONDUIT

[75] Inventors: Burton L. Weintraub, Old Bethpage; Salvatore Buda, Maspeth, both of N.Y.

[73] Assignee: Berger Industries, Inc., Maspeth, N.Y.

[21] Appl. No.: 564,823

[22] Filed: Apr. 3, 1975

Related U.S. Application Data

[63] Continuation-in-part of Ser. No. 464,121, April 25, 1974, abandoned, which is a continuation of Ser. No. 246,384, April 21, 1972, abandoned.

[51] Int. Cl.$^2$ ............................................. F16L 17/06
[52] U.S. Cl. .................................. 285/340; 277/121; 277/DIG. 2; 285/351; 285/354
[58] Field of Search ................. 285/45, 340, 341, 302, 285/47, 52, 39, 110, 354, 351; 85/1 JP; 151/7, 14 DW; 277/121, DIG. 2

[56] References Cited

U.S. PATENT DOCUMENTS

| 1,326,626 | 12/1919 | Wolfe | 285/39 |
|---|---|---|---|
| 2,064,140 | 12/1936 | Appleton | 285/340 |
| 2,187,880 | 1/1940 | Kaysing | 285/341 |
| 3,485,517 | 12/1969 | Howe | 285/341 |
| 3,799,584 | 3/1974 | Slocum | 85/1 JP X |
| 3,951,436 | 4/1976 | Hyde, Jr. | 285/110 X |
| 4,005,879 | 2/1977 | Berger et al. | 285/354 |

FOREIGN PATENT DOCUMENTS

| 1,283,618 | 11/1968 | Germany | 285/47 |
|---|---|---|---|
| 506,965 | 12/1954 | Italy | 285/341 |
| 723,400 | 2/1955 | United Kingdom | 285/340 |
| 813,145 | 5/1959 | United Kingdom | 285/341 |
| 511,751 | 8/1939 | United Kingdom | 285/45 |

Primary Examiner—Werner H. Schroeder
Assistant Examiner—Conrad L. Berman
Attorney, Agent, or Firm—Kirschstein, Kirschstein, Ottinger & Frank

[57] ABSTRACT

A light walled circular metallic conduit including a first conduit member and a second conduit member. An expanded section is at one end of the first conduit member and an end of said second conduit member is snugly telescoped within said expanded section of said first conduit member. The expanded section has external threads thereon and a nut is provided which is internally threaded. Inside the nut is a split ring. The nut encircles a seal. Upon tightening the nut the split ring bites into the second conduit member. A skirt is affixed to the nut and includes a finger which extends into a gap between the nut and the second conduit member so as to prevent water from leaking into said gap and into the interior of said first and second conduit members.

5 Claims, 9 Drawing Figures

LIGHT WALLED CONDUIT
CROSS-REFERENCES TO RELATED APPLICATIONS

This application is a continuation in part of co-pending application Ser. No. 464,121 filed Apr. 25, 1974 by Burton L. Weintraub and Salvatore Buda for LIGHT WALLED CONDUIT WITH INTEGRAL FITTING, now abandoned. Application Ser. No. 464,121 was a continuation of application Ser. No. 246,384 filed Apr. 21, 1972 by Burton L. Weintraub and Salvatore Buda. Application Ser. Nos. 246,384 and 464,121 are now abandoned.

BACKGROUND OF THE INVENTION

1. Field of the Invention

Light walled conduits for cables or the like

2. Description of the Prior Art

The electrical code of many cities requires that electrical cables be encased in a rigid metal conduit. Some codes require the rigid conduit only when the electric line are otherwise exposed whereas other codes require the rigid conduit even if the electric cables are behind a wall, above a ceiling or encased in concrete.

The metal conduits which are used are not like ordinary water or gas pipes because they are not subjected to the rigors to which such pipes are exposed. The metallic conduits which encase electrical cables simply protect the cables which are threaded therethrough and, accordingly, are made of thin walls. The reason for the thin walls is to bring the price of the conduit to a low level so that the conduit can be used rather than ordinary armored cable.

The rigid metal conduit is usually provided in finite lengths which are coupled end to end to each other when the length of cable which must be encased is greater than the length of a single unit of conduit. The prior art has taught the use of couplings for joining units of conduit to each other. A coupling is a short length fitting one end of which is joined to one end of a length of conduit and the other end of which is joined to an end of the next adjacent length of conduit. A journeyman in the field has had to take with him couplings of various sizes to conform to the sizes of conduit that he will be installing.

It is extremely important that the seepage of water into the interior of the conduit which encases electrical cable be prevented for obvious reasons. While the water which is in the vicinity of a conduit might not be at a high pressure, nevertheless very frequently the water leaked into the interior thereof.

SUMMARY OF THE INVENTION

Purposes of the Invention

It is an object of the present invention to provide an improved rigid light walled metal conduit for electrical cables or the like wherein separate conduit members are easily interconnected and wherein the seepage of water into the conduit members at the joints between the conduit members is prevented.

Brief Description of the Invention

According to the present invention, the foregoing as well as other objects are achieved by a first light walled metal conduit member an end of which is externally threaded. A nut includes internal threads which are adapted to engage the external threads on the first conduit member.

A split ring is provided which is of a harder material than a second conduit member which is to be secured to the first conduit member. The split ring is within the internal threads of the nut. A seal is located within said split ring.

A rubber skirt surrounds the nut and includes a lip which hooks under a portion of the nut adjacent a radial surface thereof which radial surface is spaced from the nut internal threads and constitutes a free end of the nut.

In use, the second conduit member is inserted into said first conduit member and snugly fits therein. The nut is tightened causing the ends of the split ring to bite into the second conduit member forming a tight seal therewith. The skirt prevents the seepage of water past the free end of the nut into the interior of the conduit members.

The invention accordingly consists in the features of construction, combination of elements and arrangement of parts which will be exemplified in the light walled conduits with integral fitting hereinafter described and of which the scope of application will be indicated in the appended claims.

BRIEF DESCRIPTION OF THE DRAWINGS

In the drawings in which are shown various possible embodiments of my invention.

DESCRIPTION OF THE PREFERRED EMBODIMENT

Figure 1:
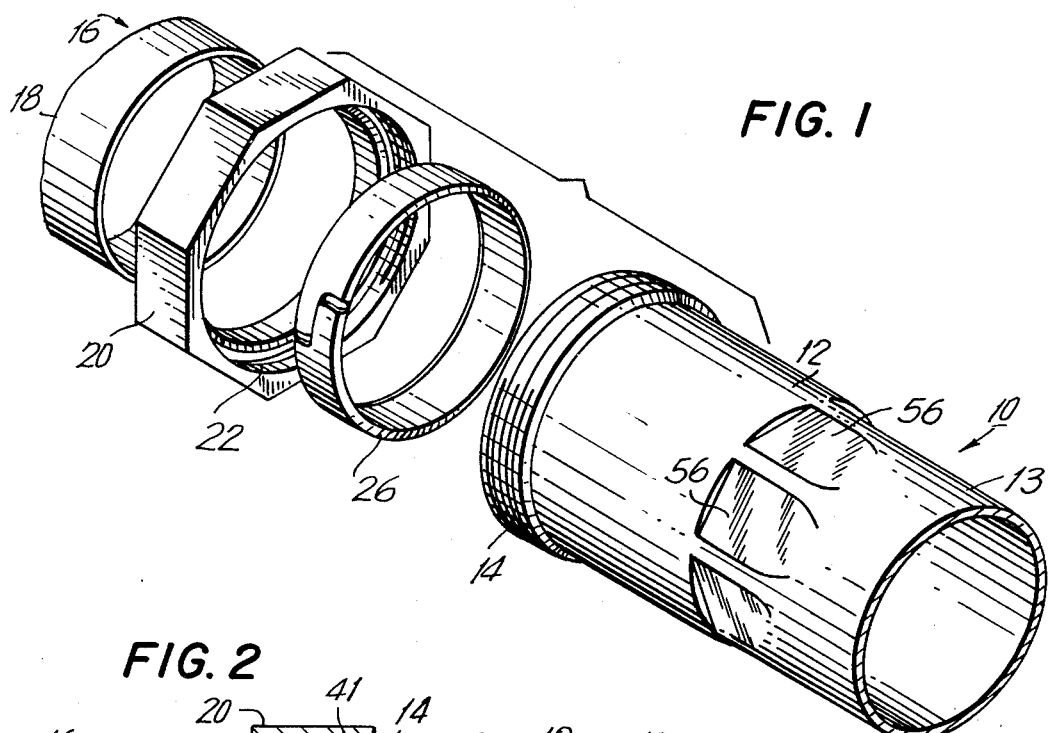
FIG. 1 is an exploded perspective view of the elements of the light wall conduit in accordance with the present invention.
Figure 2:
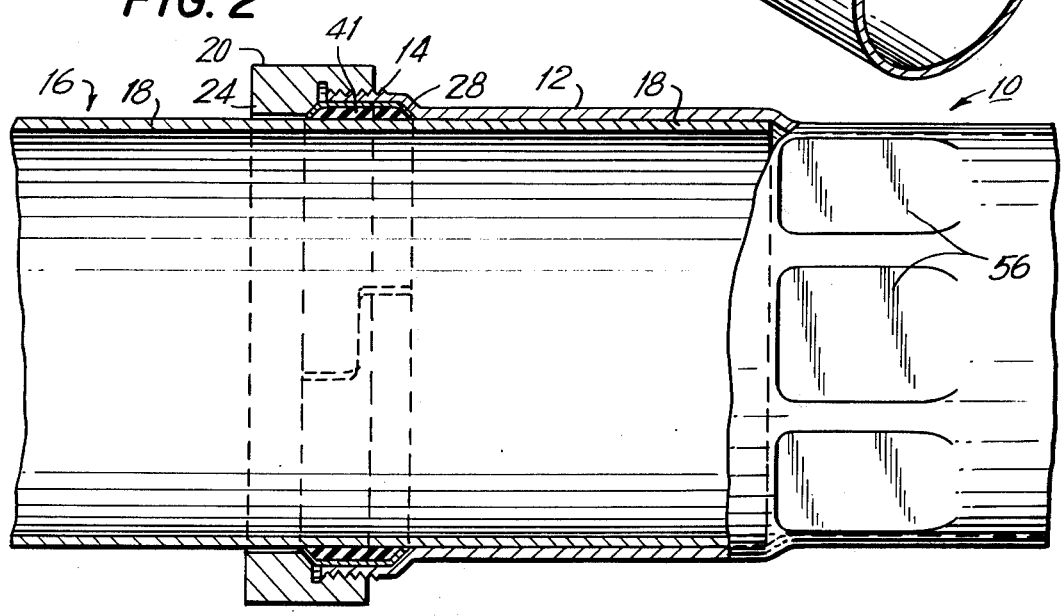
FIG. 2 is a partially broken away side view of one embodiment of assembled conduit sections wherein a neoprene seal is placed between the split ring and non-expanded portion of the second conduit member.
Figure 3:
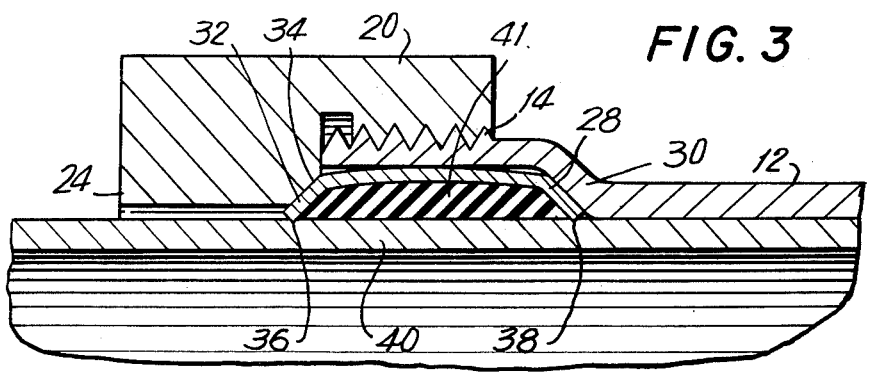
FIG. 3 is an enlarged view of part of FIG. 2 showing the split ring biting into the second conduit member.

Referring now to FIGS. 1 to 3, the invention will now be explained with reference to this particular embodiment.

A first conduit member 10 is shown having an expanded bell section 12 of constant circular cross-section at one end thereof, and a non-expanded section 13 of lesser circular cross-section adjacent expanded section 12, and extending to the other end thereof. In this embodiment, expanded ball section 12 has a further expanded externally threaded section 14. An adjacent second conduit member 16 is also shown, wherein one end 18 is non-expanded so as to fit snugly and telescopically within expanded ball section 12 of conduit member 10 as shown in FIG. 2. The other end of second conduit member 16 may be non-expanded or may have an expanded bell section similar to the expanded bell section 12.

A nut 20 is provided having internal threads 22. The external shape of nut 20 in this instance is octagonal, but could be any other type polygonal shape, such as hexagonal. Inner threads 22 of nut 20 can be screwed onto external threaded section 14 of first member 10 after non-expanded end 18 of second conduit member 16 is placed completely within the socket defined by expanded bell section 12 of first conduit member 10. Nut 20 has an inwardly extending flange 24 which is close to but spaced from the non-expanded portion of second conduit member 16.

A hard steel split ring 26 fits within further expanded externally threaded section 14 of first conduit member 10. One inclined edge 32 of split ring 26 is adapted to butt against an inclined inner corner 34 of flange 24. As nut 20 is screwed onto threaded section 14, edges 32 and 28 of split ring 26 are compressed between corner 34 and transition section 30. Split ring 26 is made of a material which is harder than the material of the conduit members so that an end 36 of edge 32 and an end 38 of edge 28 of split ring 26 bite into a wall 40 of second conduit member 16 until nut 20 cannot be tightened any further. When this happens conduit members 10 and 16 become firmly fastened together.

Also in this embodiment, if so desired, a neoprene seal ring 41 can be placed between split ring 26 and wall 40 of second conduit member 16, so as to insure that the coupling between conduit members 10 and 16 is gas tight. Said seal is compressed to tightly engage wall 40 as the ring itself is compressed on the seal by axial movement of flange 24 and the transition section toward each other.

Figure 4:
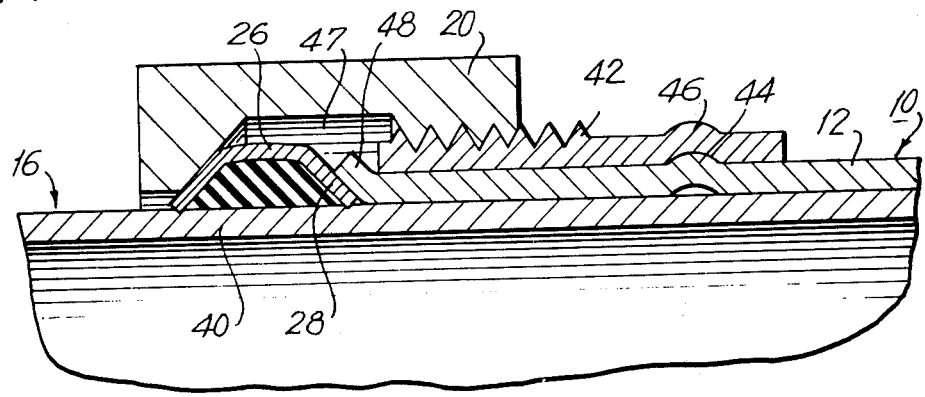
FIG. 4 is a partial sectional view of another embodiment of the assembled conduit sections shown in FIG. 2, wherein the expanded section has a male threaded sleeve attached thereto.

In the embodiment shown in FIG. 4, expanded bell section 12 has a separate externally threaded sleeve 42 fixed or staked thereto by indentations 44 and 46 in respective bell section 12 and section 42. Nut 20 is similarly screwed onto threaded portion 42, as previously described with respect to the embodiment shown in FIGS. 1 to 3. In this instance, however, split ring 26 fits within a pocket 47 in nut 20, the pocket being formed by an inwardly directed flange having an inclined inner corner. Bell section 12 has a flared end 48 which is adapted to abut edge 28 of split ring 26, so that split ring 26 will again bite into wall 40 of second conduit member 16 as nut 20 is screwed onto separate threaded section 42, so as to provide an excellent physical interconnection between conduit members 10 and 16.

Figure 5:
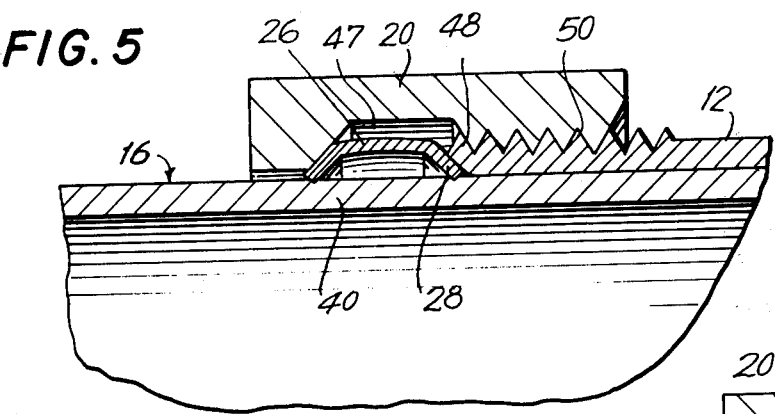
FIG. 5 is a partial sectional view of another embodiment of the invention, similar to that shown in FIG. 4 but having no neoprene seal.
Figure 7:
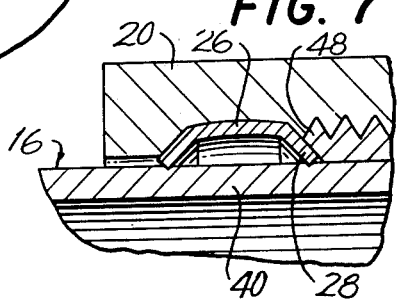
FIG. 7 is a partial sectional view of an embodiment of the invention similar to that shown in FIG. 5, but wherein the top of the split ring bears against the interior of the nut.

In the embodiments shown in FIGS. 5 and 7, bell section 12 extends to the end of the first conduit member 10 and has a threaded section 50 formed thereon, which engages the internally threaded portion of nut 20. Again in this instance, split ring 26 fits within pocket 47 in nut 20, (in FIG. 7 the top of split ring 26 rests against the interior of nut 20) and bell section 12 has flared end 48 adapted to abut edge 28 of split ring 26 in order to again insure that split ring 26 will bite into wall 40 of second conduit member 16 as nut 20 is screwed onto bell section 12, so as to physically connect conduit member 10 to conduit member 16.

Figure 6:
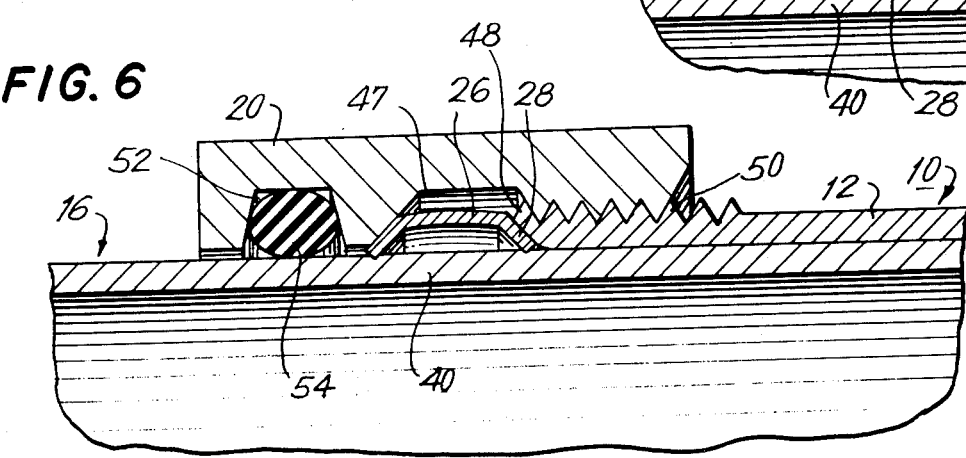
FIG. 6 is a partial sectional view of another embodiment of the invention similar to that shown in FIG. 2, but wherein the neoprene seal is spaced from the split ring.

In the embodiment shown in FIG. 6, nut 20 has a slot 52 formed therein for receiving a neoprene O-ring 54 so as to provide a fluid seal between first conduit member 10 and nut 20.

In order to facilitate the tightening of nut 20 onto the threaded portion of first conduit member 10, non-expanded portion 13 of first conduit member 10 contains flats 56 thereon, as shown in FIG. 1, which flats are adjacent bell section 12, whereby a tool can engage flats 56 so as to prevent first conduit member 10 from rotating while nut 20 is being screwed onto the externally threaded section of first conduit member 10. In this example, non-expanded portion 13 of first conduit member 10 has eight flat sections so as to be compatible with octagonal shaped nut 20, but, of course, the number of flat sections can vary.

Figure 8:
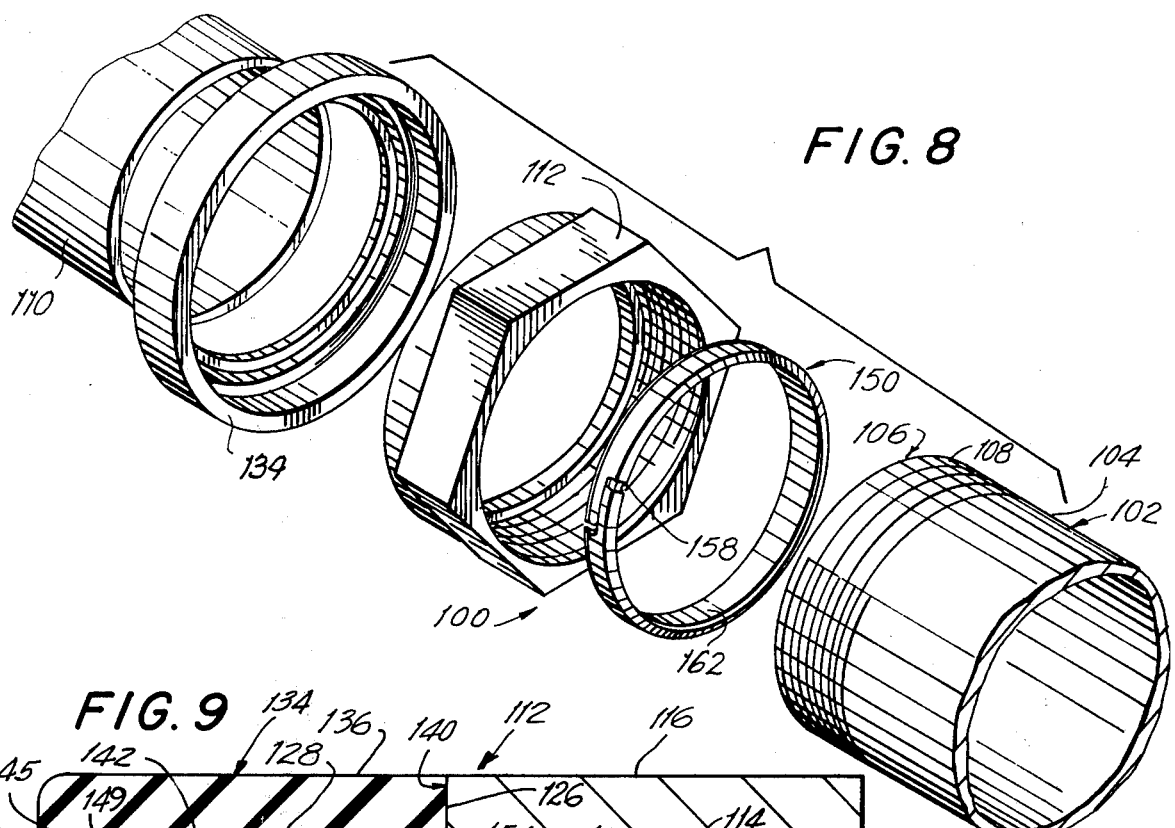
FIG. 8 is a partially exploded view of a still further embodiment of the present invention.
Figure 9:
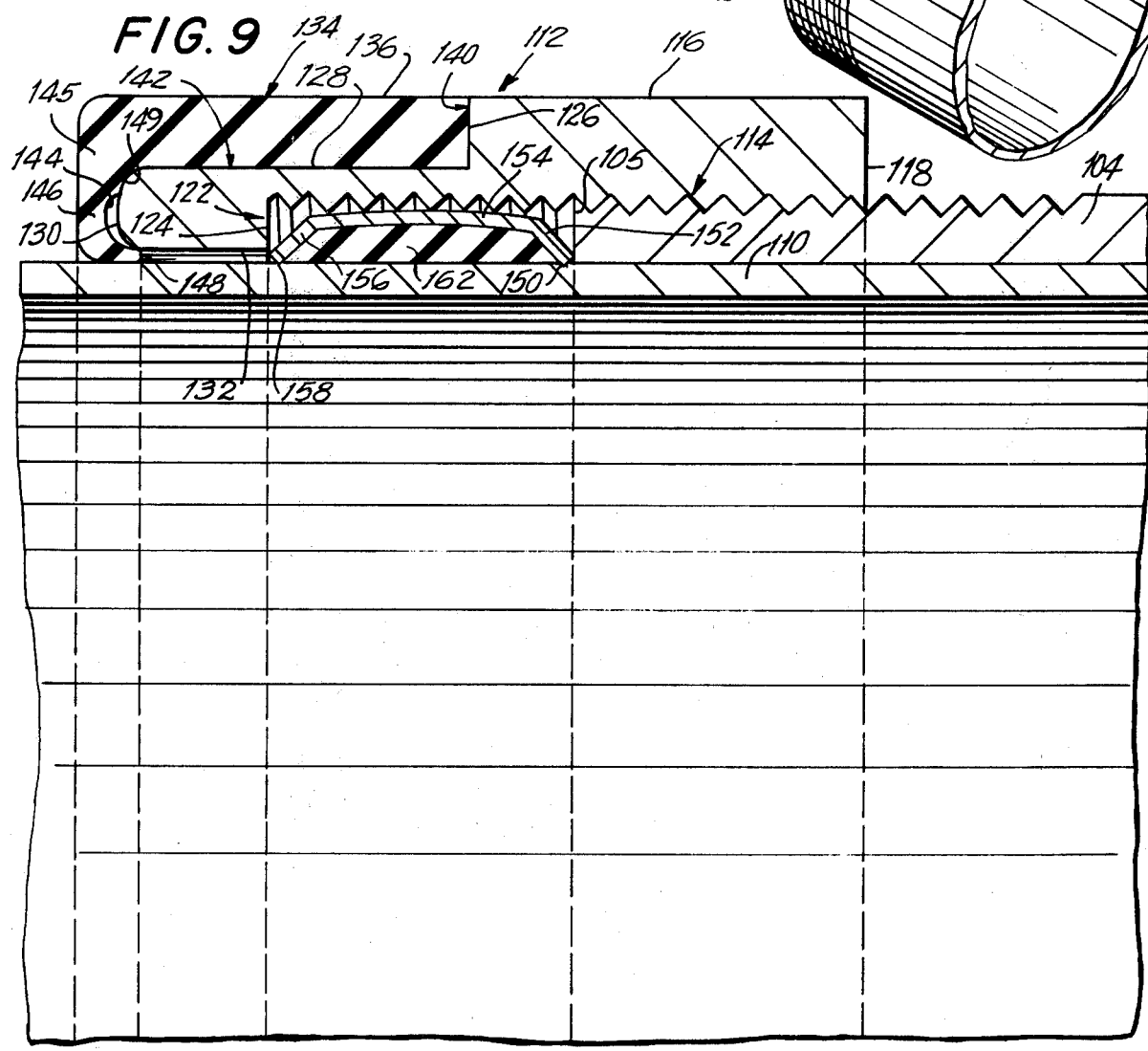
FIG. 9 is a partial axial sectional view of the assembled structure of FIG. 8.

In FIGS. 8 and 9 of the drawings a first conduit member 102 is shown having an expanded section 104 of constant circular cross-sectional area. The portion of first conduit member 102 not shown in the drawings is of reduced constant circular cross-sectional area when compared to section 104 in the same fashion that conduit member 10 in FIG. 1 includes segments having different constant circular cross-sectional areas. Section 104 includes an end 106 that has external threads 108 thereon. Conduit member 102 includes an end face 105 (FIG. 9).

A second conduit member 110 is provided which includes a non-expanded section that can snugly telescopically fit within section 104 of conduit member 102. The other end of conduit member 110 may be expanded so as to receive a non-expanded end of another conduit member, etc.

A hexagonal nut 112 with internal threads 114 is adapted to be screwed onto external threads 108. Nut 112 includes a periphery 116. Periphery 116 can be hexagonal, as shown, or include raised spaced apart segments which facilitate gripping by a wrench. A first radial end surface 118 extends inwardly from periphery 116. A radially inwardly extending flange 122 is formed at the intersection of threads 114 and internal surface 124. Said flange has an internal surface 124, said internal surface 124 being parallel to surface 118 and extending radially inwardly from threads 114.

A cylindrical skirt receiving surface 128 is perpendicular to an end surface 126 and is concentric with the longitudinal central axis of nut 112. End surface 126 extends radially inwardly from the periphery of nut 112 and is parallel to end surface 118. A shoulder is formed at the intersection of surfaces 126 and 128. A further end surface 130 extends radially inwardly from cylindrical skirt receiving surface 128 to an inner cylindrical surface 132. There is a slight curvature at the junction between surfaces 128 and 130 and between surfaces 130 and 132. When the structure is assembled as shown in FIG. 9 there is a slight gap between surface 132 of nut 112 and the external surface of conduit member 110.

An elastomeric skirt 134 circumscribes the end of nut 112 remote from internal threads 114. Said skirt includes an outer surface 136 which is the same distance approximately from the center of conduit member 110 as is periphery 116 of nut 112 so as to be flush therewith. Skirt 134 includes a radially inwardly directed surface 140 which seats against surface 126 of nut 112. Extending axially away from the innermost portion of surface 140 of skirt 134 is an inner circular surface 142 which seats on circular skirt receiving surface 128 of nut 112. A radially inwardly directed surface 149 of flange 145 extends radially inwardly from the left end (as viewed in FIG. 9) of surface 142 for engagement with surface 130 to orientate the skirt as shown in FIG. 9. There is a slight curvature between surfaces 142 and 144. A thin annulus 146 extends radially inwardly from the inner edge of flange 145. Annulus 146 is spaced from surface 130 and terminates in a thin flexible retroverted lip 148, the tip of which extends into the gap between surface 132 of nut 112 and the external surface of conduit member 110. A small gap 149 separates surface 130 of nut 112 from annulus 146.

Adhesive means is used to fix skirt 134 in the aforesaid position.

A steel compression split ring 150 is provided which includes an inclined end edge 152, an arcuate center portion 154 and a further inclined end edge 156. Said inclined end edges slope in an outwardly radially converging direction. Split ring 150 encircles conduit member 110 in the assembled construction shown in FIG. 9. The split ring is made from a harder material than the material from which conduit member 110 is constructed. The ends of the split ring overlap in a direction parallel to the longitudinal axis of the split ring. At each end of the split ring is a notch at one side thereof and the remainder of each end fits into the notch at the opposite end thereof. End edge 156 has an angular corner 158 the two sides of which are at acute angles to the outer surface of conduit member 110 for the assembled construction of FIG. 9. An identical corner structure is provided for end edge 152.

Enclosed by split ring 150 is a neoprene seal 162.

In use, with conduit members 110 and 102 positioned as shown in the drawings and the structure assembled as shown in the drawings, nut 112 is tightened so that surface 124 of said nut and surface 105 of conduit member 104 force the inner corners of the split ring to bite into conduit member 110 applying a compressive force to seal 162.

Retroverted lip 148 fills the gap between surface 132 of nut 112 and conduit member 110 to form a fluid-tight seal that prevents leakage of water through the gap. This minimizes the chance of water leaking into the interior of either of the conduit members.

In practice, it has been found that the concept of the present invention is particularly useful when applied to AISI 1010 steel tubing. Other metals and even certain rigid plastics may also be suitably used. The outside diameters of the conduit may range from 2½ inches to 4½ inches and the wall thicknesses may be in the order of from 0.072 inches to 0.083 inches. The expanded bell section may have an axial length of from 3 to 3⅝ inches.

Depending upon the manufacturing tolerances of the conduit wall thicknesses, as well as the outside diameter of the conduit, the inside diameter of the expanded bell section may range from 0.015 inches to 0.060 inches greater than the outside diameter of the non-expanded end. Of course, it should be understood that the foregoing characteristics are set forth by way of explanation only, and are not intended to be limiting in any sense.

It thus is seen that there are provided light walled conduits with integral fittings which achieve the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described the invention there is claimed as new and desired to be secured by Letters Patent:

1. A light walled circular metallic conduit comprising a first conduit member and a second conduit member identical to said first conduit member, said first conduit member including a first end in the form of an expanded bell section having a constant circular cross section, an end of said second conduit member being nonexpanded and having a constant circular cross section, said end of said second conduit member being snugly received within said first end of said first conduit member in a telescopic relation, an externally threaded section functionally unitary with said first end of said first conduit member, a nut having adjacent first and second sections and internal threads on said first section matingly engaging said externally threaded section, a radially inwardly directed internal surface on said nut at the junction of said first and second sections, said second section having an end face with curved top and bottom edges, an end surface opposing said radially inwardly directed internal surface of said nut on said externally threaded section of said first conduit member, a split ring of harder material than said second conduit member, said split ring having a central portion flanked by two inclined edge portions, said edge portions diverging in a radially inward direction, said split ring having circumferentially overlapping end portions, each end portion including a notch at one side thereof with the other end portion fitting into said notch, an elastomeric seal encircled by said split ring and surrounding said second conduit member, an annular gap between said second section of said nut and said second conduit member and an annular leakage preventing elastomeric skirt movable with said nut and secured thereto, said skirt including a flange extending radially inwardly and constructed and arranged for engagement with said top edge of said end face to orientate said skirt on said nut, said flange spaced from the remainder of said end face to create an annulus therebetween, said flange terminating in a retroverted lip having a gradually diminishing thickness extending into and filling said gap to form a watertight seal whereby as said nut is screwed on to said externally threaded section, said radially inwardly directed internal surface of said nut and said end surface of said threaded section force said split ring to bite into said second conduit member.

2. A light walled circular metallic conduit according to claim 1 wherein said nut includes an external groove and a portion of said skirt is received in said groove.

3. A light walled circular metallic conduit according to claim 1 wherein said split ring includes radially inwardly directed end edges, the end edges of said split ring having angular corners the two sides of which are at acute angles to the outer surface of the second conduit member.

4. A light walled circular metallic conduit comprising a first conduit member and a second conduit member, said first and second conduit members being identical, said first conduit member including a first end, an end of said second conduit member being snugly received within said first end of said first conduit member in a telescopic relation, means mechanically connecting said two ends, said connecting means including a male threaded element fixed on one of said members and a nut rotatable and axially slideable on the other member, said nut having a radially inwardly extending flange the free edge of which is near but spaced from the outer surface of the one member to provide an annular gap, an annular member between the end of the one conduit member and the flange, said annular member being squeezed between the flange and the end of the one conduit member when the nut is tightened on the threaded element, and an elastomeric skirt functionally unitary with the nut, said skirt including a retroverted lip of diminishing thickness extending into and filling said gap to form a water-tight seal thereat.

5. A light-walled circular metallic conduit comprising a first conduit member and a second conduit member identical to said first conduit member, said first conduit member including a first end, an end of said second conduit member being adjacent said first end of said first conduit member, means mechanically connecting said two ends, said connecting means including a male threaded element fixed on one of said member and a nut rotatable and axially slideable on the other member, said nut having a radially inwardly extending flange the free edge of which is near but spaced from the outer surface of the one member to provide an annular gap, an annular member between the end of the one conduit member and the flange, said annular member being squeezed between the flange and the end of the one conduit member when the nut is tightened on the threaded element, and an elastomeric skirt functionally unitary with the nut, said skirt including a retroverted lip of diminishing thickness extending into and filling said gap to form a water-tight seal thereat.

* * * * *